(12) United States Patent
Arpee et al.

(10) Patent No.: US 8,320,264 B2
(45) Date of Patent: Nov. 27, 2012

(54) METHOD AND APPARATUS FOR DETERMINING PATH LOSS BY ACTIVE SIGNAL DETECTION

(75) Inventors: John Arpee, Herndon, VA (US); John Peter Carlson, Dulles, VA (US)

(73) Assignee: Andrew LLC, Hickory, NC (US)

( * ) Notice: Subject to any disclaimer, the term of this patent is extended or adjusted under 35 U.S.C. 154(b) by 812 days.

(21) Appl. No.: 11/920,076

(22) PCT Filed: May 17, 2006

(86) PCT No.: PCT/US2006/017517
§ 371 (c)(1),
(2), (4) Date: Dec. 15, 2008

(87) PCT Pub. No.: WO2006/124341
PCT Pub. Date: Nov. 23, 2006

(65) Prior Publication Data
US 2009/0149171 A1   Jun. 11, 2009

Related U.S. Application Data

(60) Provisional application No. 60/681,475, filed on May 17, 2005.

(51) Int. Cl.
*G08C 15/00* (2006.01)
*H04J 1/16* (2006.01)
*H04J 3/17* (2006.01)
*H04B 17/00* (2006.01)

(52) U.S. Cl. ............... 370/252; 370/433; 455/67.11; 455/226.2

(58) Field of Classification Search .......... None
See application file for complete search history.

(56) References Cited

U.S. PATENT DOCUMENTS 3,150,372 A   9/1964   Groth, Jr.
(Continued)

FOREIGN PATENT DOCUMENTS

EP   1 081 972 A2   3/2001
(Continued)

OTHER PUBLICATIONS

Amir Leshem, Mati Wax, "Array. Calibration in the Presence of Multipath," IEEE Transactions on Signal Processing, vol. 48, No. 1, pp. 53-59, Jan. 2000.

(Continued)

*Primary Examiner* — Chirag Shah
*Assistant Examiner* — Ashley Shivers
(74) *Attorney, Agent, or Firm* — Duane Morris LLP (57) ABSTRACT

In one embodiment, the disclosure relates to a method for determining a path loss value of a signal transmitted from a wireless device and received by a receiver, where the wireless device and the receiver operate within a wireless communication system having at least one cell having at least one sector operating on at least one frequency channel. The method includes: (i) identifying a geographic area where the path loss value is to be determined; (ii) identifying a first cell, a first sector, and a first frequency channel associated with the geographic area wherein said wireless device is actively communicating with said receiver using said first frequency channel; (iii) receiving at said receiver the signal transmitted from said wireless device on said first frequency channel; (iv) receiving at said receiver an indication of transmission signal strength of said signal; (v) measuring at said receiver the received signal strength of said signal; and (vi) determining the path loss value of said first frequency channel as a function of the indication of transmission signal strength and the received signal strength.

41 Claims, 3 Drawing Sheets

U.S. PATENT DOCUMENTS

| | | |
|---|---|---|
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,497,503 A | 3/1996 | Rydberg et al. |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,862,124 A | 1/1999 | Hottinen et al. |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,175 A | 4/2000 | Trompower |
| 6,047,192 A | 4/2000 | Maloney |
| 6,049,717 A | 4/2000 | Dufour et al. |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,137,991 A * | 10/2000 | Isaksson ............ 455/67.11 |
| 6,138,024 A | 10/2000 | Evans et al. |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,236,365 B1 | 5/2001 | LeBlanc et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,363,263 B1 | 3/2002 | Reudink et al. |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,522,888 B1 * | 2/2003 | Garceran et al. ........... 455/456.3 |
| 6,526,279 B1 | 2/2003 | Dent |
| 6,546,256 B1 | 4/2003 | Maloney |
| 6,553,322 B1 | 4/2003 | Ignagni |
| 6,556,832 B1 | 4/2003 | Soliman |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,751,187 B2 * | 6/2004 | Walton et al. ................. 370/210 |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,853,842 B1 | 2/2005 | Wilson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,990,348 B1 * | 1/2006 | Benveniste ................... 455/447 |
| 6,996,392 B2 | 2/2006 | Anderson |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney |
| 7,427,952 B2 | 9/2008 | Bull et al. |
| 7,440,762 B2 | 10/2008 | Maloney et al. |
| 7,593,738 B2 | 9/2009 | Anderson |
| 2002/0042276 A1 * | 4/2002 | Hakalin et al. ................ 455/453 |
| 2002/0058503 A1 | 5/2002 | Gutowski |
| 2002/0172160 A1 * | 11/2002 | Moulsley ..................... 370/252 |
| 2002/0172223 A1 | 11/2002 | Stilp et al. |
| 2003/0039217 A1 * | 2/2003 | Seo et al. ..................... 370/318 |
| 2003/0064734 A1 | 4/2003 | Stilp et al. |
| 2003/0129987 A1 | 7/2003 | Tanay et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy et al. |
| 2004/0132466 A1 | 7/2004 | Kennedy, Jr. et al. |
| 2004/0137912 A1 | 7/2004 | Lin |
| 2004/0203897 A1 | 10/2004 | Rogers |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0136951 A1 * | 6/2005 | Gibbons et al. ............... 455/464 |
| 2005/0164712 A1 | 7/2005 | Kennedy, Jr. et al. |
| 2005/0192026 A1 | 9/2005 | Carlson et al. |
| 2005/0192042 A1 * | 9/2005 | Au et al. ...................... 455/522 |
| 2005/0271012 A1 * | 12/2005 | Agrawal et al. ............... 370/331 |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |

| | | | |
|---|---|---|---|
| 2007/0155401 | A1 | 7/2007 | Ward et al. |
| 2007/0155489 | A1 | 7/2007 | Beckley et al. |
| 2007/0202885 | A1 | 8/2007 | Kennedy, Jr. et al. |
| 2008/0132244 | A1 | 6/2008 | Anderson et al. |
| 2008/0132247 | A1 | 6/2008 | Anderson et al. |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |

FOREIGN PATENT DOCUMENTS

| | | |
|---|---|---|
| EP | 1146760 A2 | 10/2001 |
| EP | 1191804 A2 | 3/2002 |
| GB | 2 311 912 A | 10/1997 |
| JP | 06-347529 | 12/1994 |
| WO | 94/02995 A1 | 2/1994 |
| WO | 9927737 A1 | 6/1999 |
| WO | 0213439 A2 | 2/2002 |
| WO | 03001742 A1 | 1/2003 |
| WO | 2006088472 A1 | 8/2006 |

OTHER PUBLICATIONS

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless. Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

European Patent Office, European Search Report for related European Application No. 06770051.8, dated Apr. 18, 2008.

Y. Zhao, "Standardization of Mobile Phone Positioning for 3G Systems," IEEE Communications Magazine, Jul. 2002, pp. 108-116.

C. Drane, M. Macnaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam. pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Lettes, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

* cited by examiner

METHOD AND APPARATUS FOR DETERMINING PATH LOSS BY ACTIVE SIGNAL DETECTION

The disclosure claims the filing-date benefit of Provisional Application No. 60/681,475 filed May 17, 2005, the specification of which is incorporated herein in its entirety; the disclosure also relates to application entitled "Method and Apparatus for Determining Path Loss by Combining Geolocation with Interference Suppression" and application entitled "Method and Apparatus for Determining Coupled Path Loss" filed simultaneously herewith and assigned to the assignee of the instant disclosure, the specification of each of said related application is incorporated herein in its entirety for background information.

BACKGROUND

Path loss is a measure of signal attenuation. Path loss is the difference between the transmitted signal power and the received signal power. Path loss has the units of Decibels (dB) and is a positive quantity which excludes the affects of the antenna gains. In its simplest form, path loss can be defined according to the free-space model of equation (1):

$$PL(dB) = P_t - P_r \qquad (1)$$

where PL denoted path loss, $P_t$ is the signal's transmitted power level and $P_r$ is the signal level recorded at the receiver, measured in units of decibels, such as dBm. Equation (1) assumes that there is no antenna gain at the transmitter and the receiver.

Path loss is least pronounced where a visible line of sight is available between the transmitter and the receiver where there is little or no electromagnetic interference. Electromagnetic interference is typically in the form of co-channel interference. Conversely, path loss is more pronounced as obstacles and electromagnetic sources interfere with signal propagation. Because path loss is a measure of signal attenuation, and therefore, bit error rate, it is an important tool in measuring quality of service throughout a wireless network.

In wireless networks, service quality across geographic areas is audited by conducting drive tests. In such tests, a transmitter is positioned at different locations to send a beacon signal. The transmitter's signal level and the location of the transmitter are recorded. The receivers then record the received signal level. Using the transmitted and received signal levels, path loss between the two locations can be computed.

Once a frequency channel is dedicated to the path loss measurement, the transmitter's signal strength for the beacon signal and its location are recorded. The receiver then measures and records the received signal strength. Using the transmitted and received signal strengths a processor can determine the path loss value at the transmitter's location.

Dedicating a specific channel for path loss measurements and rearranging the remaining channels on the frequency use plan to accommodate the path loss-dedicated frequency channel is both costly and inefficient. Thus, there is a need for a method and apparatus for assessing path loss without setting aside an otherwise active frequency channel or disturbing the frequency use plan.

SUMMARY OF THE DISCLOSURE

In one embodiment, the disclosure relates to a method for determining a path loss value of a signal transmitted from a wireless device and received by a receiver, where the wireless device and the receiver operate within a wireless communication system having at least one cell having at least one sector operating on at least one frequency channel. The method includes: (i) identifying a geographic area where the path loss value is to be determined; (ii) identifying a first cell, a first sector, and a first frequency channel associated with the geographic area wherein said wireless device is actively communicating with said receiver using said first frequency channel; (iii) receiving at said receiver the signal transmitted from said wireless device on said first frequency channel; (iv) receiving at said receiver an indication of transmission signal strength of said signal; (v) measuring at said receiver the received signal strength of said signal; and (vi) determining the path loss value of said first frequency channel as a function of the indication of transmission signal strength and the received signal strength.

In another embodiment, the disclosure relates to a method for determining a path loss value of a signal transmitted from a wireless device and received by a receiver, where the wireless device and the receiver operate within a wireless communication system having at least one cell having at least one sector on at least one frequency channel. The method comprises identifying a first frequency channel in an active communication between the wireless device and the receiver; geolocating the wireless device and the receiver; receiving at the receiver the signal transmitted from said wireless device on said first frequency channel; receiving at said receiver an indication of transmission signal strength of said signal; measuring at said receiver the received signal strength of said signal; and determining the path loss value of said first frequency channel as a function of the indication of transmission signal strength and the received signal strength.

In still another embodiment, the disclosure relates to a system for determining a path loss value of a signal transmitted from a wireless device and received by a receiver, where the wireless device and the receiver operate within a wireless communication system having at least one cell having at least one sector operating on at least one frequency channel, the system comprises a circuitry including a microprocessor and a memory for compiling a database for receiving the path loss values. The circuitry is configured with instructions to (i) identify a geographic area where the path loss value is to be determined; (ii) identify a first cell, a first sector, and a first frequency channel associated with the geographic area wherein said wireless device is actively communicating with said receiver using said first frequency channel; (iii) receive at said receiver the signal transmitted from said wireless device on said first frequency channel; (iv) receive at said receiver an indication of transmission signal strength of said signal; (iv) measure at said receiver the received signal strength of said signal; and (v) determine the path loss value of said first frequency channel as a function of the indication of transmission signal strength and the received signal strength.

In still another embodiment, the disclosure relates to an apparatus for determining a path loss value of a signal transmitted from a wireless device and received by a receiver. The apparatus includes means for identifying an active communication channel supporting at least one desirable attribute; means for identifying the wireless device and the receiver tasked to communicate on said active communication channel; means for locating said wireless device and said receiver; means for identifying a transmitted signal strength for signaling on said active communication channel; means for identifying a received signal strength for signaling on said active communication channel; and means for calculating the path loss value as a function of the transmitted signal strength and the received signal strength.

BRIEF DESCRIPTION OF THE DRAWINGS

The principles of the disclosure will be discussed in relation with the exemplary and non-limiting representations, in which.

DETAILED DESCRIPTION

Figure 1:
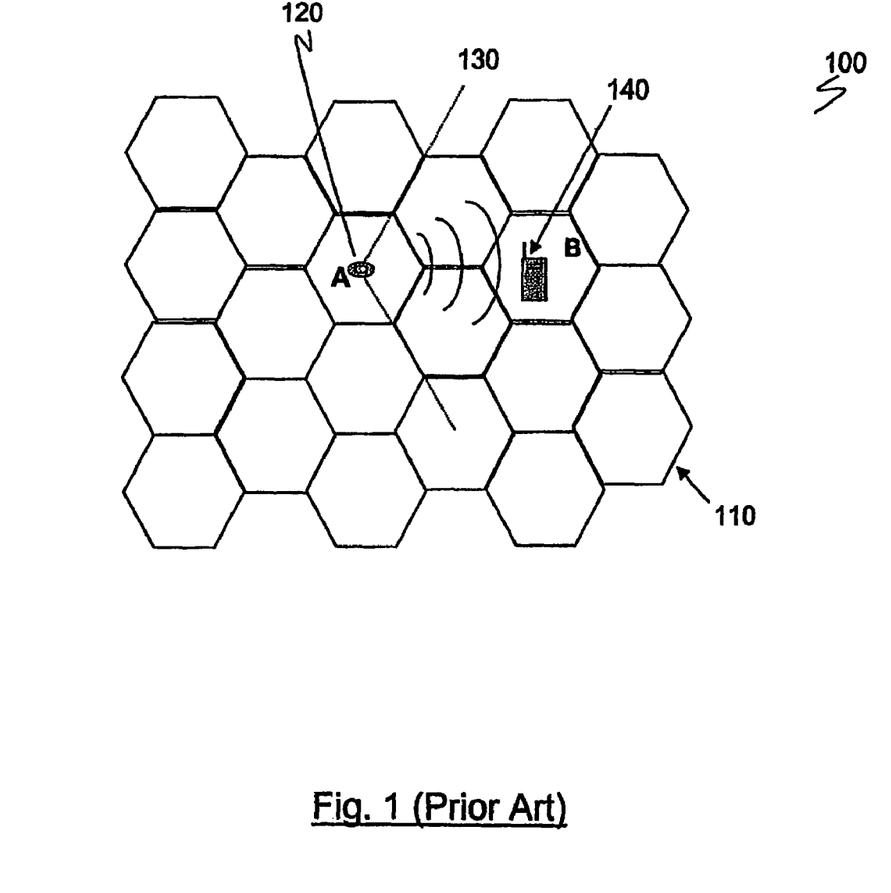
FIG. 1 is a schematic representation of a conventional cellular communication system.

FIG. 1 is a schematic representation of a conventional cellular communication system. Referring to FIG. 1, the geographic area 100 is divided into cells 110, includes cell A and cell B. Receiver 120 is located at cell A. The receiver can include a radio transceiver, a base station or a wireless location system ("WLS"). The receiver can also include a combined base station and WLS. Conventional frequency use plan uses several directional antennas each radiating at a specified sector. In FIG. 1, a directional antenna (not shown) at receiver 120 is radiating at a portion of cell 110 curving sector 130.

When sectoring is used, as shown in FIG. 1, the frequency channels used in a particular cell are divided into sector groups and are used only within a particular sector. By carefully assigning non-interfering frequency channels to the downstream receivers (not shown) whose broadcast area overlaps with receiver 120, co-channel interference can be further reduced. Sophisticated frequency use plans must account for co-channel interference as well as other possible interferences.

To obtain the path loss value between wireless device 140 and receiver 120, the transmission signal strength, the received signal strength and the location of the wireless device and the receiver must be known. As briefly discussed, conventional systems determine the path loss value by assigning a dedicated frequency channel to the wireless device and disabling interfering frequency channels within the wireless communication system. Setting aside a dedicated frequency channel also requires revising the frequency use plan for the entire geographic area which is costly and inefficient.

In one embodiment of the disclosure, a method for accurately determining the received and transmitted signal strengths includes using an active communication channel without disabling the frequency use plan to provide a dedicated frequency channel.

An active frequency channel (interchangeably, an active communication channel) defines one or more frequency channels which are a part of the frequency use plan and are available for communication to wireless devices within the geographic area. Indeed, the active frequency channel may be engaged in active communication with a receiver or another wireless device while the system is conducting its signal strength studies for path loss determination. Using an existing channel engaged in active communication obviates the need for a dedicated channel and a revised frequency use plan.

Figure 2:
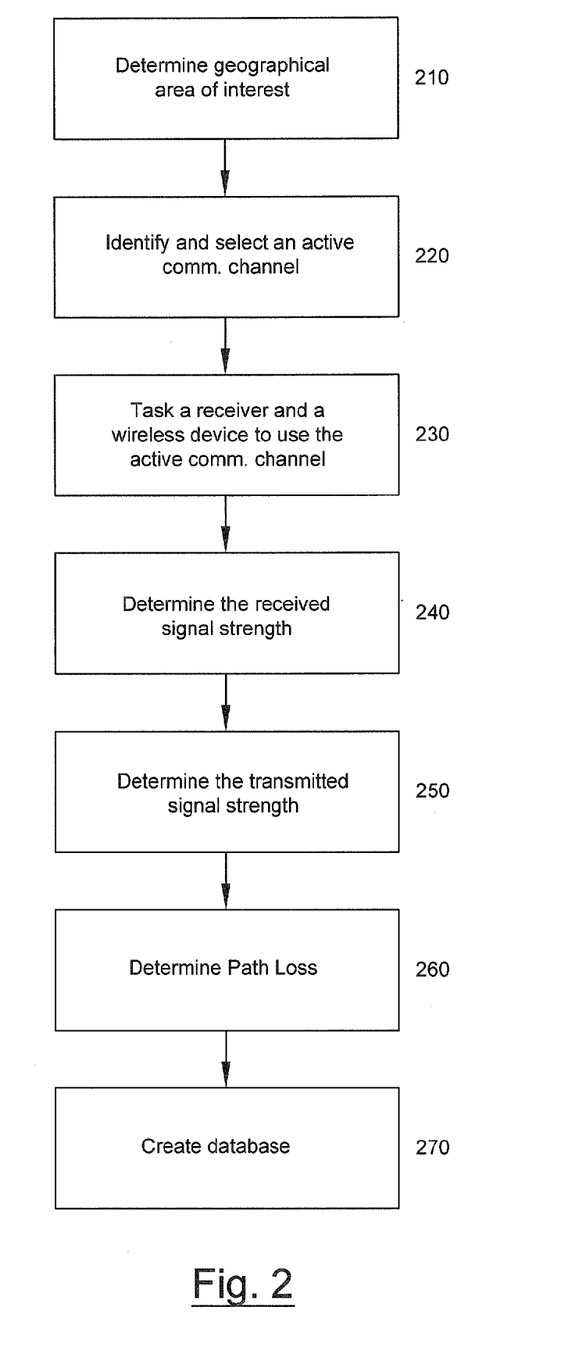
FIG. 2 is a flow-diagram schematically representing an embodiment of the disclosure.

FIG. 2 is a flow-diagram schematically representing an embodiment of the disclosure. According to the embodiment of FIG. 2, a method for determining signal strength of a signal transmitted by a wireless device starts with step 210; that is, determining the area where path loss information is needed. This step can be the result of a study of the network deficiencies or as part of a network-wide analysis. Once the desired area is identified, step 220 identifies one or more active communication channels for the desired area.

In one embodiment, active communication channels are selected from among all available frequency channels designated for real-time communication between two subscribers or between a subscriber and a receiver. For example, an active communication channel may be a communication channel designated for communication between two subscribers using duplex voice or data transmission. An active communication channel may also provide a simplex communication for traffic information between a base station and a wireless device. An active communication channel can be used, for example, as a reverse control channel or a forward control channel. In another embodiment, the active communication channel may be a dedicated frequency channels assigned for communication between two subscribers.

Once all active communication channels have been identified, a final selection can be made based on the attributes of each channel. Among others, the attributes may include having a desirable signal-to-noise ratio ("SNR"), signal-to-interference ratio or carrier-to-interference ratio. The selection criteria may also include secondary factors calculated to ensure that the selected active communication channel is substantially free of noise and/or interference. In the event that a substantially interference-free communication channel is not available, the selection criteria should be revised to accommodate communication channels which are relatively interference-free. In the event that a desired active communication channel is affected by, for example co-channel interference, the interfering frequency channel can be reassigned to reduce interference. Frequency channel interference can be caused by, among others, adjacent channel interference, co-channel interference, inter-symbol interference or cross-rail interference.

In step 230, once the active communication channel is selected and if the active communication channel is not in use, a subscriber in the desired region may be assigned to the active communication channel. In one embodiment, the location of the wireless device and/or the receiver tasked with the active communication channel is also determined. In an alternative embodiment, only the cell and the sector housing the wireless device is determined.

In steps 240 and 250, the transmitted and the received signal strengths are determined for communication on the active channel and used for calculating the path loss value in step 260. For example, the receiver can measure the received signal strength and the wireless device can transmit an indication of the transmission signal strength. Using appropriate mathematical relationships (e.g., Equation 1), the path loss value can be then calculated (step 260). Thus, the path loss value between the wireless device and the receiver can be determined. Since the locations of the wireless device and the receiver are also known, the path loss information can be used to form a database of path loss values at different locations throughout the network (step 270). That is, other suitable active communication channels can be identified at the desired area to provide additional path loss values thereby forming a more comprehensive study of path loss throughout the network.

By using an active communication channel, the path loss measurement can be conducted without disrupting an existing frequency use plan to allocate a specific frequency channel for path loss calculations. In addition, because the disclosed embodiment determines path loss on an otherwise interference-free communication channel, the results can be as reliable as using a dedicated frequency channel for beacon signaling.

Figure 3:
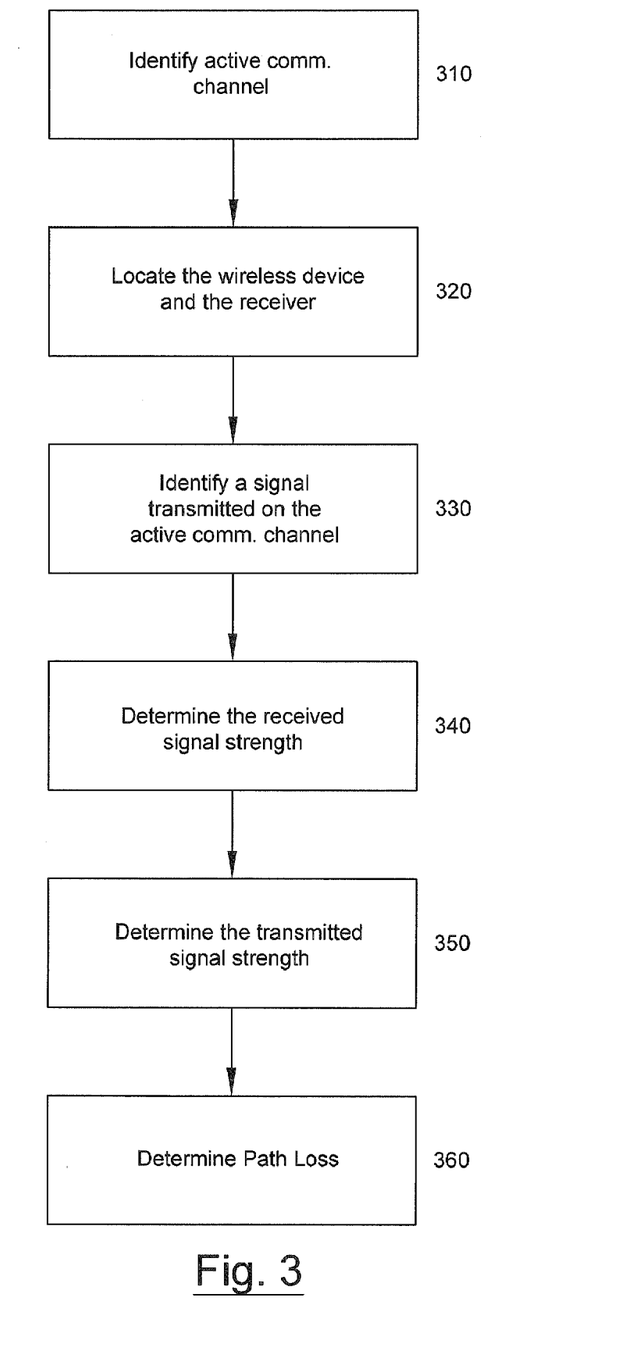
FIG. 3 is a flow-diagram schematically representing an embodiment of the disclosure.

FIG. 3 is a flow-diagram schematically representing an embodiment of the disclosure directed to a method for determining the path loss value throughout a network by identifying substantially interference-free active communication channels at step 310. Such identification can be random or selective. For example, several active communication channels can be selected at random from among all communication channels serving the wireless network. Alternatively, one or more active communication channels can be selected from among all communication channels serving the cell or the sector and/or based on selection criteria disclosed above. In the event that a desired active communication channel is affected by interference, the interfering frequency channels can be reassigned to reduce interference.

In step 320, the wireless device and the receiver tasked with the selected active communication channel are located. Any of the conventional locating means can be used for this purpose. In step 330, a signal transmitted on the active communication channel is detected for signal strength measurement, and in steps 340 and 350 the received signal strength and the transmitted signal strength, respectively, are determined. The path loss value can be measured as a function of the received and transmitted signal strength.

In another embodiment, the method of FIGS. 2 and 3 can be expanded to a plurality of receiver. By way of example and with reference to FIG. 1, once an active communication channel has been identified, all other receivers which can detect the wireless device's signal transmission on said channel can be included in path loss calculation. Assuming that signal transmission to each of the receivers satisfies one or more of the desired attributes, the path loss value between the wireless device and each of the plurality of receivers can be obtained. Because the receivers are disposed at different locations from each other and from the wireless device, path loss values between the wireless device and several different locations can be determined simultaneously.

A system according to one embodiment of the disclosure may include one or more receivers in communication with a wireless device. The wireless device may include a wireless transmitter, radio frequency transmitter, mobile telephone, cellular telephone, text messaging device, portable computer, laptop computer, personal digital assistant, vehicle security device, vehicle tracking device and pager. The receiver may comprise a base station, a wireless location sensor or a second wireless device.

The system can have one or more circuits having multiple microprocessors for implementing the principles disclosed herein. In one embodiment the circuitry can be configured with instructions to identify a geographic area where path loss data is needed. The instructions may include identifying a cell and/or a sector associated with the area as well as identifying available communication channels tasked to the area. The same circuits or an associated circuit can identify suitable active communication channels on the basis of attributes described above or on the basis of any suitable criteria. Once the active communication channel has been identified and selected, the system can determine a path loss value based on the transmitted and the received signal strengths of a wireless device signaling thereon.

An apparatus according to one embodiment of the disclosure can include a first circuit for identifying an active communication channel supporting one or more desirable attributes. The first circuit can be prompted to search for the active communication channel in response to an operator's request or it can be programmed to randomly scan all frequency communication channels to identify active communication channels supporting at least one desirable attribute.

The first circuitry may include an antenna communicating with a radio receiver and a first microprocessor. The apparatus may also include a second circuit for identifying the wireless device and the receiver tasked to communicate on the active communication channel. In the event that two wireless devices are tasked to communicate on the active communication channel, the second circuit may identify each wireless device. The second circuit may include one or more processors programmed with instructions to search a database stored in a digital memory identifying wireless devices using the network. The apparatus may also include a third circuit for locating the wireless devices and the receivers. The third circuit can be a wireless location sensor in communication with the receiver, a geo-positioning system ("GPS"), or a GPS system in communication with the receiver.

The apparatus may also include a fourth circuit for identifying the transmitted signal strength for signaling on the active communication channel. The fourth circuit can be a receiver adapted to receive an indication from the wireless device defining its transmission signal strength. A fifth circuit can be included to determine the received signal strength. The fifth circuit can comprise any conventional detector for measuring the received signal strength. Finally, the apparatus may include a sixth circuit for calculating path loss value as a function of the transmitted and the received signal strengths.

Each of the six circuits may define a separate or an integral operating unit. Alternatively, one or more of the circuits may be combined based on their overlapping functions. The circuits may be co-located for ease of operation. Alternatively, the various circuits can be communicably located at different locations without departing from the disclosed principles.

While the exemplary embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for determining a path loss value of a signal transmitted from a wireless device and received by a receiver, where the wireless device and the receiver operate within a wireless communication system having at least one cell having at least one sector operating on at least one frequency channel, the method comprising the steps of:
   identifying a geographic area where the path loss value is to be determined;
   identifying a first cell, a first sector, and a first frequency channel associated with the geographic area wherein said wireless device is actively communicating with said receiver using said first frequency channel without disabling any other communication channel;
   receiving at said receiver the signal transmitted from said wireless device on said first frequency channel;
   receiving at said receiver an indication of transmission signal strength of said signal;
   measuring at said receiver the received signal strength of said signal; and
   determining the path loss value of said first frequency channel as a function of the indication of transmission signal strength and the received signal strength.

2. The method of claim 1, further comprising the steps of:
   determining a second frequency channel which interferes with said first frequency channel; and
   reassigning a second signal using said second frequency channel to a third frequency channel.

3. The method of claim 1, further comprising determining the path loss value for a plurality of geographic areas to compile a database.

4. The method of claim 1, wherein the receiver is a base station.

5. The method of claim 1, wherein the receiver is a wireless location sensor.

6. The method of claim 1, wherein the wireless devices is selected from the group consisting of wireless transmitter, radio frequency transmitter, mobile telephone, cellular phone, text messaging device, portable computer, laptop computer, personal digital assistant, vehicle security device, vehicle tracking device and pager.

7. The method of claim 1, wherein the wireless device is engaged in one of a duplex or a simplex communication.

8. The method of claim 1, further comprising randomly selecting said first frequency channel from among a plurality of frequency channels associated with said geographic area and engaged in active communication with said receiver.

9. The method of claim 1, further comprising selecting said first frequency channel from among a plurality of frequency channels associated with said geographic area and having at least one desired attribute.

10. The method of claim 9, wherein the attribute is selected from the group consisting of signal-to-noise ratio, signal-to-interference ratio and carrier-to-interference ratio.

11. The method of claim 1, further comprising identifying the location of the receiver and the wireless device.

12. A circuitry configured to implement the method of claim 1.

13. A method for determining a path loss value of a signal transmitted from a wireless device and received by a receiver, where the wireless device and the receiver operate within a wireless communication system, the method comprising:
    identifying a first frequency channel in an active communication between the wireless device and the receiver without disabling any other communication channel;
    geolocating the wireless device and the receiver;
    receiving at the receiver the signal transmitted from said wireless device on said first frequency channel;
    receiving at said receiver an indication of transmission signal strength of said signal;
    measuring at said receiver the received signal strength of said signal; and
    determining the path loss value of said first frequency channel as a function of the indication of transmission signal strength and the received signal strength.

14. The method of claim 13, further comprising the steps of:
    determining a second frequency channel which interferes with said first frequency channel; and
    reassigning a second signal using said second frequency channel to a third frequency channel.

15. The method of claim 13, further comprising determining the path loss value for a plurality of geographic areas to compile a database.

16. The method of claim 13, wherein the first frequency channel in active communication is engaged in a duplex communication.

17. The method of claim 13, wherein the first frequency channel in active communication is engaged in a simplex communication.

18. The method of claim 13, further comprising selecting said first frequency channel from among a plurality of frequency channels having at least one desired attribute.

19. The method of claim 18, wherein the attribute is selected from the group consisting of signal-to-noise ratio, signal-to-interference ratio, inter-symbol interference and carrier-to-interference ratio.

20. The method of claim 13, wherein the receiver is a plurality of receivers each disposed at a different location from each other and a different from the location of the wireless device.

21. The method of claim 13, wherein the receiver is a base station or a wireless location sensor ("WLS") or a combination of the base station and a WLS.

22. A circuitry configured to implement the method of claim 13.

23. A system for determining a path loss value of a signal transmitted from a wireless device and received by a receiver, where the wireless device and the receiver operate within a wireless communication system having at least one cell having at least one sector operating on at least one frequency channel, the system comprising:
    a circuitry including a microprocessor and a memory for compiling a database for receiving the path loss values, the circuitry configured with instructions to:
    identify a geographic area where the path loss value is to be determined;
    identify a first cell, a first sector, and a first frequency channel associated with the geographic area wherein said wireless device is actively communicating with said receiver using said first frequency channel without disabling any other communication channel;
    receive at said receiver the signal transmitted from said wireless device on said first frequency channel;
    receive at said receiver an indication of transmission signal strength of said signal;
    measure at said receiver the received signal strength of said signal; and
    determine the path loss value of said first frequency channel as a function of the indication of transmission signal strength and the received signal strength.

24. The system of claim 23, wherein the circuitry is further programmed with instructions to:
    determine a second frequency channel which interferes with said first frequency channel; and
    reassign a second signal using said second frequency channel to a third frequency channel.

25. The system of claim 23, wherein the circuitry is further programmed with instructions to determine the path loss value for a plurality of geographic areas to compile a database.

26. The system of claim 23, wherein the receiver is selected from the group consisting of wireless transmitter, radio frequency transmitter, mobile telephone, cellular phone, text messaging device, portable computer, laptop computer, personal digital assistant, vehicle security device, vehicle tracking device, pager, base station and wireless location sensor.

27. The system of claim 23, wherein the wireless devices is selected from the group consisting of wireless transmitter, radio frequency transmitter, mobile telephone, cellular phone, text messaging device, portable computer, laptop computer, personal digital assistant, vehicle security device, vehicle tracking device and pager.

28. The system of claim 23, wherein the wireless device is engaged in one of a simplex or a duplex communication area.

29. The system of claim 23, wherein the circuitry is further programmed with instructions to randomly select said first frequency channel from among a plurality of frequency channels associated with said geographic.

30. The system of claim 23, wherein the circuitry is further programmed with instructions to select said first frequency channel from among a plurality of frequency channels associated with said geographic area and having at least one desired attribute.

31. An apparatus for determining a path loss value of a signal transmitted from a wireless device and received by a receiver, comprising:
   means for identifying an active communication channel supporting at least one desirable attribute;
   means for identifying the wireless device and the receiver tasked to communicate on said active communication channel without disabling any other communication channel;
   means for locating said wireless device and said receiver;
   means for identifying a transmitted signal strength for signaling on said active communication channel;
   means for identifying a received signal strength for signaling on said active communication channel; and
   means for calculating the path loss value as a function of the transmitted signal strength and the received signal strength.

32. The apparatus of claim 31, wherein the desirable attribute comprises of at least one of a signal-to-noise ratio, a signal-to-interference ratio, an inter-symbol interference and a carrier-to-interference ratio below a threshold value.

33. The apparatus of claim 31, wherein the means for identifying an active communication channel comprises an antenna, a radio receiver and a microprocessor.

34. The apparatus of claim 31, wherein the means for identifying the wireless device and the receiver comprises a microprocessor programmed with instructions to search a database stored in a digital memory.

35. The apparatus of claim 31, wherein the means for locating said wireless device and said receiver comprises a wireless location system.

36. The apparatus of claim 31, wherein the means for locating said wireless device and said receiver comprises a geo-positioning system ("GPS").

37. The apparatus of claim 31, wherein the transmitted signal strength defines the signal strength at the wireless device.

38. The apparatus of claim 31, wherein the means for identifying a transmitted signal strength for signaling on said active communication channel comprises an antenna and a signal detection circuit.

39. The apparatus of claim 31, wherein means for identifying the wireless device and the receiver further comprises means for tasking the wireless device and the receiver to signal on said active communication channel.

40. The apparatus of claim 31, further comprising means for detecting a second communication channel interfering with the active communication channel.

41. The apparatus of claim 40, further comprising means for reassigning the second communication channel to a third communication channel.

* * * * *